US010854350B2

(12) United States Patent
Allemand

(10) Patent No.: US 10,854,350 B2
(45) Date of Patent: Dec. 1, 2020

(54) LIGHT STABILITY OF NANOWIRE-BASED TRANSPARENT CONDUCTORS

(71) Applicant: CHAMP GREAT INT'L CORPORATION, Eden Island (SC)

(72) Inventor: Pierre-Marc Allemand, San Jose, CA (US)

(73) Assignee: Cambrios Film Solutions Corporation, Tortola (VG)

( * ) Notice: Subject to any disclaimer, the term of this patent is extended or adjusted under 35 U.S.C. 154(b) by 758 days.

(21) Appl. No.: 14/664,679

(22) Filed: Mar. 20, 2015

(65) Prior Publication Data

US 2015/0270024 A1     Sep. 24, 2015

Related U.S. Application Data

(60) Provisional application No. 62/074,497, filed on Nov. 3, 2014, provisional application No. 61/968,257, filed on Mar. 20, 2014.

(51) Int. Cl.
*H01B 1/02* (2006.01)
*B32B 15/08* (2006.01)
(Continued)

(52) U.S. Cl.
CPC ............... *H01B 1/02* (2013.01); *B32B 7/12* (2013.01); *B32B 15/02* (2013.01); *B32B 15/08* (2013.01); *B32B 17/064* (2013.01); *C09D 11/52* (2013.01); *B32B 2262/103* (2013.01); *B32B 2307/202* (2013.01); *B32B 2307/40* (2013.01); *B32B 2307/412* (2013.01); *B32B 2457/00* (2013.01); *B32B 2551/00* (2013.01); *G02B 2207/121* (2013.01); *Y10T 428/24994* (2015.04); *Y10T 428/2804* (2015.01); *Y10T 442/10* (2015.04)

(58) Field of Classification Search
CPC ........... C09D 11/52; H01B 1/02; B32B 15/02; B32B 15/08; B32B 2307/202; B32B 2307/40; B32B 2307/412; B32B 2457/00; B32B 2551/00; B32B 7/12; Y10T 442/10; B82Y 30/00
See application file for complete search history.

(56) References Cited

U.S. PATENT DOCUMENTS 3,865,786 A * 2/1975 Mueller .................... C07F 9/02
                                                          524/131
6,777,479 B1 * 8/2004 Bernard .................. B82Y 30/00
                                                          524/186
(Continued)

FOREIGN PATENT DOCUMENTS

WO    WO2008143714    * 11/2008    ............... H01B 1/04
WO    2011125981 A1    10/2011

OTHER PUBLICATIONS

Int. Search Report cited in PCT Application No. PCT/US2015/021851 dated Apr. 2, 2015, 4 pgs.
(Continued)

*Primary Examiner* — Jennifer A Steele
(74) *Attorney, Agent, or Firm* — Cooper Legal Group, LLC

(57) ABSTRACT

Disclosed herein are photo-stable optical stacks including a transparent conductive film formed by silver nanostructures or silver mesh. In particular, one or more light stabilizers (such as transition metal salts) are incorporated into one or more constituent layers of the optical stack.

9 Claims, 8 Drawing Sheets

(51) Int. Cl.
*B32B 15/02* (2006.01)
*B32B 17/06* (2006.01)
*B32B 7/12* (2006.01)
*C09D 11/52* (2014.01)

(56) References Cited

U.S. PATENT DOCUMENTS

| | | | |
|---|---|---|---|
| 2005/0014948 A1* | 1/2005 | Galbo | C07D 211/94 |
| | | | 546/184 |
| 2009/0226753 A1 | 9/2009 | Naoi | |
| 2011/0018424 A1* | 1/2011 | Takada | H01L 31/022466 |
| | | | 313/352 |
| 2012/0295071 A1* | 11/2012 | Sato | G06F 3/041 |
| | | | 428/188 |
| 2013/0087363 A1 | 4/2013 | Oh et al. | |
| 2013/0341571 A1 | 12/2013 | Iijima et al. | |
| 2014/0234661 A1* | 8/2014 | Allemand | H01B 1/02 |
| | | | 428/673 |

OTHER PUBLICATIONS

Written Opinion cited in PCT Application No. PCT/US2015/021851 dated Apr. 2, 2015, 5 pgs.

\* cited by examiner

LIGHT STABILITY OF NANOWIRE-BASED TRANSPARENT CONDUCTORS

CROSS-REFERENCE TO RELATED APPLICATIONS

This application claims the benefit under 35 U.S.C. § 119(e) of U.S. Provisional Patent Application Nos. 61/968,257, filed Mar. 20, 2014, and 62/074,497, filed Nov. 3, 2014, which applications are incorporated herein by reference in their entirety.

BACKGROUND

This disclosure relates to the field of nanotechnology, and more specifically describes methods and structures for transparent conducting films having either, or both, a silver nanostructure layer or silver mesh conductive layer with superior light stability.

BRIEF SUMMARY

Described herein are light-stable transparent conductors having a silver mesh or nanostructure-based conductive layer and methods for making the same. In particular, light stability is markedly improved in transparent conductors that incorporate one or more light stabilizers, such as one or more transition metal additives.

One embodiment provides an optical stack comprising: a conductive film includes silver nanowires or silver mesh; and a light stabilizer comprising a transition metal salt or a transition coordination complex.

In various further embodiments, the optical stack further comprises a substrate, an optically clear adhesive, an overcoat, in which the light stabilizer is incorporated.

Further embodiments provide devices that incorporate the optical stacks described herein.

Yet another embodiment provides a coating composition comprising: a plurality of silver nanowires; and a light stabilizer comprising a transition metal salt or a transition coordination complex.

DETAILED DESCRIPTION

Transparent conductors are thin, transparent conductive films constructed by a silver nanostructure layer or a silver mesh layer, or both. These transparent conductors are particularly suited for use in the display industry. However, they must demonstrate good environmental (thermal, humidity and light) reliability in order to be incorporated in commercial products.

Preparation of a nanostructure-based conductive film typically involves forming multi-layer structures including a base substrate, a nanostructure layer or film, and an optional protective layer or overcoat "OC," as well as an optically clear adhesive "OCA." Typically, these constituent layers are sequentially coated or bonded by an OCA layer. As used herein, a "nanostructure layer" or "nanowire layer" refers to a thin film of interconnected or networking silver nanowires. The multi-layer structure is also referred to as an "optical stack."

It is sometimes observed that the reliability of conductive films under accelerated light testing can be less than the standard industry requirements. For instance, the sheet resistance of the conductive film may start drifting or increasing after prolonged or intense light exposure. This can sometimes be addressed by carefully selecting the base materials for substrates and top layers (including the OCA).

However, it would be desirable to fabricate transparent conductive films with better light stability, irrespective of the base materials that form the substrates or the other constituent layers.

While not being bound by theory, it is believed that certain active species (including oxygen and reactive oxygen species, etc.) are the most likely candidates for causing light-induced instability. One possible source for generating these active species may be plasmon excitation on the surface of the metal nanowires.

A peculiar consequence of oxygen diffusing unevenly into the optical stack is that photo-degradation can sometimes be extremely localized at the edge of a shadow mask (i.e., the interface or edge between a light-exposed area and a dark area). The highly localized photo-degradation leads to a sharp increase of sheet resistance at the edge, compared to the sheet resistances in the dark or light-exposed areas. This observation is also referred to herein as an "edge failure."

Figure 1:
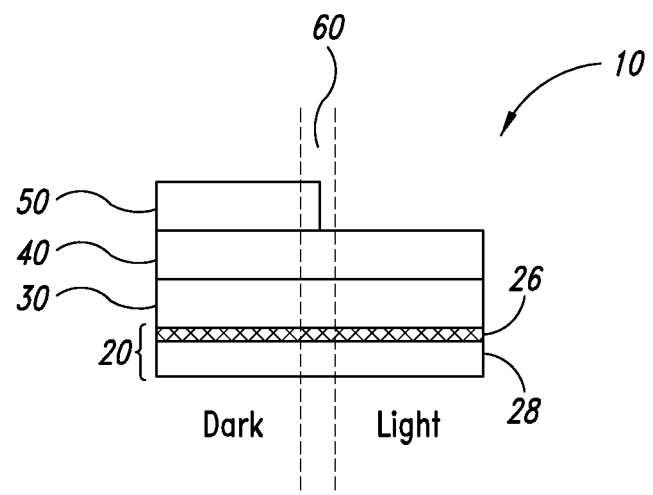
FIG. 1 shows a standard configuration of an optical stack including a nanostructure layer.

FIG. 1 shows a standard optical stack (10) including a nanostructure layer (20) bonded, by an OCA layer (30), to a cover glass (40). The nanostructure layer (20) includes (not shown) a plurality of networking conductive nanowires (e.g., silver nanowires) coated on a substrate. In the configuration shown, the nanowires are facing up and contacting the OCA layer. The conductive film may be used as a part of a device such as display. As shown, a black deco frame (50) is placed on the periphery of the display, and the location of the edge or interface between light-exposed area and a dark area is indicated (60).

Figure 2:
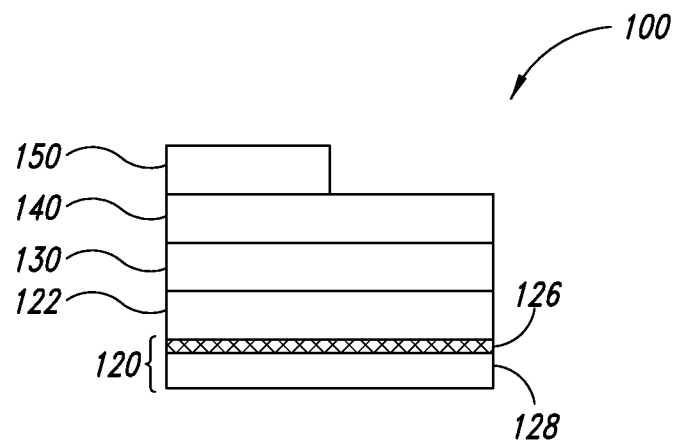
FIG. 2 shows an alternative configuration of an optical stack that includes an overcoat layer overlying the nanostructure layer.

FIG. 2 shows an alternative configuration of another standard optical stack (100), in which the nanowire layer (120) is first overcoated. The overcoat (122) is typically coated on the side of the nanowires (126) that have been coated on a substrate (128) and cured. Thereafter, the overcoat layer is bonded to a cover glass (140) by an OCA layer (130). A black deco frame (150) is also shown.

Light Stability Under Accelerated Light Condition

An ambient environmental chamber can be used as a testing equipment that provides simulated light and ambient conditions in which the optical stack operates. Typically, a xenon arc lamp (e.g., Atlas XXL+) may be used as a solar simulator. The xenon arm lamp provides a full spectrum of light closely matching the sunlight. The intensity of the light may be adjusted to simulate direct sunlight or indirect diffuse sunlight at different times of the day or season. In addition, the environmental chamber may adjust for the temperature (including the chamber temperature and the back panel temperature), relative humidity (RH) and the like.

Light Stabilizers

Various embodiments are directed to conductive films or optical stacks incorporating one or more light stabilizers. The light stabilizers may operate according to any number of mechanisms. For example, the light stabilizers may deactivate or neutralize the oxygen or other active species that are present or have diffused into the conductive film. In particular, the light stabilizers may act as catalysts to accelerate the reaction of oxygen with the organic materials present in the optical stacks so that the oxygen is rapidly consumed by the organic materials before interacting with the silver nanostructures. The silver nanostructures are in the vicinity of a number of organic materials, including substrates, binder materials, overcoat, OCAs, etc., all of which may be capable of consuming oxygen under the appropriate catalytic conditions. Alternatively, the light stabilizers may quench the plasmon excitation on the metal surface, thereby curtailing the generation of active species. Regardless of the specific mechanism of stabilization, the light stabilizers described herein contribute to stabilizing the sheet resistance of the conductive films or optical stacks that are under prolonged light exposure, especially at the light-dark interface.

In preferred embodiments, the light stabilizers are "transition metal additives" or "transition metal dopants," which terms are used interchangeably and include, for example, transition metal salts, transition metal coordination complexes, as discussed herein.

In certain embodiments, a transition metal additive is a coordination complex or metal salt which includes a central transition metal atom or ion, and a surrounding array of bound molecules or ions, also referred to as ligands. Depending on the size, charge or valency of the central metal atom or ion, the number of the ligands may vary. In some embodiments, though not all, transition metal compounds in their low oxidation state are preferred since high oxidation state metals could oxidize the silver nanowires.

Suitable transition metal dopants include, without limitation, complexes of Fe(II), Fe(III), Co(II), Co(III), Mn(II), Mn(III), V(III), V(IV), etc.

Many organic or inorganic ligands may be used as parts of the complex with the transition metals. Suitable organic ligands include for example, tris(acetylacetonato) ("acac"), ferrocene ("FC"), bipyridine, phenanthroline, N,N'-bis(salicylidene)-ethylenediamine, acetate, lactate, ascorbate, gluconate, citrate, tartrate, ethylenediaminetetraacetate, and the like. Suitable inorganic ligands include, for example, sulfate, nitrate, tetrafluoroborate, and the like.

Any combination of the disclosed transition metals and the organic or inorganic ligands are transition metal additives. Examples of suitable transition metal dopants include, without limitation, Fe(III)(acac)$_3$, Co(acac)$_2$, Mn(acac)$_3$, VO(acac)$_2$, iron (II) ascorbate, iron (II) sulfate, TRIS-(2,2'-bipyridine) iron(II) sulfate, iron(II) acetate, iron(II) D-gluconate dihydrate, iron(II) lactate hydrate, iron (III) nitrate, Iron(III) sulfate, iron(III)NH$_4$(SO$_4$)$_2$, ferrocenium tetrafluoroborate, and the like.

Certain transition metal additives are compatible with being in contact with the nanowires in a solution environment, and thus are particularly suitable for being directly incorporated in a nanowire coating composition (also referred to as "ink"). Suitable examples include transition metal salts formed with inorganic acids (e.g., to form a sulfate) or organic acids.

Organic acids are preferred because they have multiple protons available to form salt with a transition metal, and they often have other moieties (such as oxygen or nitrogen) to form coordinated bonds with the transition metal. Certain organic acids are bibasic (up to two available protons), tribasic (up to three available protons), or tetrabasic (up to four available protons), making them suitable to form stable or coordinated complex with transition metals. Specific examples of the organic acids include, without limitation, bibasic acids such as tartaric acid, tribasic acids such as citric acid, and tetrabasic acids such as ethylenediaminetetraacetic acid (EDTA).

Specific examples of the transition metal dopants include, without limitation, iron (II) sulfate, iron (III) tartrate, iron (III) sodium EDTA, ammonium iron citrate, and iron (III) citric tribasic.

Additionally, ligands such as bipyridine, phenanthroline, and N,N'-bis(salicylidene)ethylenediamine, more commonly referred to as salen, may be used in the nanowire or mesh layer, OCA or other overcoat layer separately or in conjunction with transition metal additives. These ligands can activate the trace metallic impurities already present (or added) in the film composite and make these trace metallic impurities much more reactive toward oxygen.

Yet another class of light stabilizers includes reversible redox systems, such that the photo-generated charges in the nanowire layer or mesh are rapidly and efficiently quenched by the redox species, effectively preventing photo-oxidation of the nanowires or mesh even in the presence of oxygen. One common feature among the suitable reverse redox systems is that they should be as reversible as possible so that they are being adequately regenerated instead of being consumed upon oxidation or reduction.

The redox systems may be organic (hydroquinone, TMPD, TTF, TCNQ, viologens, fullerenes, ascorbic acid and its derivatives, nitroxide derivatives, redox polymers, conducting polymers, PANI, PEDOT), organometallics (metallocenes such as ferrocene, cobaltocene, etc), or inorganic ($I^-/I_2$, $K_4Fe(CN)_6$, metal$^+$/metal$^{++}$ salts, or metal$^{++}$/metal$^{+++}$ salts, such as $Fe^{2+}/Fe^{3+}$).

Incorporation of the Light Stabilizers

The light stabilizers disclosed herein can be incorporated in any of the layers of a given optical stack, including the substrate, OCA layer, the nanowire layer (as shown in FIG. 1) and the overcoat (as shown in FIG. 2).

The light stabilizers may be incorporated in a solution-based composition that can be coated to form any of the constituent layers of a given optical stack. For instance, coating compositions for forming a nanowire layer, an overcoat layer, an undercoat layer, or an OCA layer may incorporate a predetermined amount of light stabilizers before coating.

Alternatively, a constituent layer or layers of the optical stack may be soaked in a solution of light stabilizer(s) for a period of time to allow the light stabilizer(s) to diffuse into the layers.

In yet a further embodiment, instead of being directly incorporated into a layer, the light stabilizers may be applied, in a separate or dedicated step, to a layer of the optical stack. For example, a dopant solution may be applied (e.g., spray or spin-coat) on top of the nanowire layer, before the overcoat layer is coated.

The use of light stabilizers, including transition metal additives that catalyze, scavenge oxygen or quench the surface plasmon excitation, is not limited to silver nanowires, but can be useful for protecting other metallic nanostructure and/or metal mesh transparent conductors, and oxygen sensitive elements such as light emitting diodes (including organic light emitting diodes, or OLED), photovoltaic (including organic photovoltaic, or OPV) devices, or any electrical device built onto a substrate which is not a particularly good oxygen barrier, such as flexible plastic substrates.

Overcoat Incorporating One or More Light Stabilizers

In one embodiment, the light stabilizers (e.g., transition metal dopants) may be incorporated in an overcoat composition. An overcoat is a protective layer or sealant and is typically coated directly over the nanowire layer, i.e., on the side of the nanowires. See FIG. 2. The overcoat is typically a UV-curable, highly durable polymeric material, including acrylate or epoxy materials. The overcoat is formed by coating an overcoat composition, the concentration of which could determine the thickness of the overcoat. Typically, the overcoat is a thin film of 50-200 nm thick, though other thicknesses are also contemplated.

In various embodiments, the overcoat composition may include one or more dopants at about 0.14%-30% by weight of the polymeric material (solid, excluding the solvent). Suitable amounts of the dopant by weight of the solid polymeric material can be, for example, 0.3%-8%, 0.5%-10%, 0.7%-15%, 1%-10%, 2-8%, 5-15% and the like.

In one embodiment, the overcoat composition comprises one or more UV-curable acrylate polymers. Typically, a mixture of acrylates may be used. For example, a mixture of urethane methacrylate, pentaerythritol triacrylate and trimethylolpropane triacrylate may be used (e.g., HC 5619, supplied by Addison Clear Wave Coatings Inc.) The UV-curable polymers may be dissolved in a 50/50 mixture of isopropanol (IPA) and diacetone alcohol at high concentration (40 wt % solids). The concentrated overcoat composition further comprises one or more light stabilizers, as described herein. In particular, the concentrated coating composition includes $Fe(III)(acac)_3$.

Prior to coating, the concentrated overcoat composition may be diluted to 0.5-5% of solids by adding additional solvents (e.g., IPA or diacetone alcohol, or a 50/50 mixture thereof). The dopant level in the diluted overcoat composition can be about 34-3100 ppm by weight of the composition, or more preferably, about 70 ppm-1500 ppm by weight of the composition.

Ink Incorporating One or More Light Stabilizers

In another embodiment, the light stabilizers (e.g., transition metal dopant) may also be incorporated directly into ink, i.e., nanowire coating composition that comprises silver nanowires. The light stabilizers, following coating the ink on a substrate, will be present in the nanowire layer or film.

While many metal salts are found to improve the light stability of the resulting nanowire layer, the light stability gained could be at the cost of an increase in the sheet resistance at a given haze. Haze is forward scattering of light from silver nanowires surface. Thus, a given haze value is correlatable to a given amount of silver nanowires.

It was determined that, direct incorporation of many metal salts into the coating composition tend to cause the silver nanowires be covered (at least partially) on the surface by the metal salts or their hydrated-complexes. Because metal salts or complexes tend to be less conductive than the metal nanowires, the contact resistance between nanowires is likely to increase due to the metal salt coating. As a result of the higher contact resistance, the overall sheet resistance of the nanowire layer will increase.

According to the various embodiments disclosed herein, transition metal salts or complexes formed with acids (e.g., organic acids) are capable of improving stability of conductive films without increasing the contact resistance between metal nanowires. In particular, the transition metal salts or complexes used in the nanowire coating composition are thermally or UV-degradable. As they degrade at an elevated temperature or under UV light within the coated films, the contact resistance is lowered and the sheet resistance at given haze is able to recover.

Examples of suitable transition metal dopants include, without limitation, iron tartrate, iron sodium EDTA, iron citric tribasic and ammonium iron citrate.

More specifically, the transition metal dopants may be first dissolved in DI water as high concentrated solutions. The resulting solutions may be used as ink additives in combination with the nanowire coating composition at a lower concentration. The doped nanowire coating composition (or "doped ink") may be coated at a target haze in accordance with any of the coating method describe herein. The resulting nanowire layer may be further over-coated according to a standard procedure describe herein. The overcoat may itself be doped with a transition metal dopant (e.g., Example 2).

In other embodiments, the conductive film formed from a doped nanowire composition may be subjected to a high pressure lamination process to increase the sheet resistance. As discussed herein, the presence of a transition metal dopant on the nanowire surface may increase the contact resistance between the nanowires, resulting in an increase of sheet resistance. The high pressure lamination process includes passing the film through a high pressure laminator, which process will lower sheet resistance for films coated with silver nanowire coating composition doped with one or more transition metal dopants.

OCA Layer or Substrate Incorporated with One or More Light Stabilizers

In yet another embodiment, the light stabilizers (e.g., transition metal dopants) may also be incorporated in an OCA layer. A commercial OCA film may be soaked in a solution containing one or more transition metal dopants for a sufficient period of time to allow the dopants to diffuse into the substrate. Alternatively, a solution of an adhesive and one or more transition metal dopant may be coated to form a doped OCA layer.

In a further embodiment, the transition metal dopant may also be incorporated in a substrate. Typically, a commercial substrate (e.g., PET film) may be soaked in solution containing one or more transition metal dopants for a sufficient period of time to allow the dopants to diffuse into the substrate.

EXAMPLES

Example 1

Control without Dopant

Example 1 is an optical stack of the structure shown in FIG. 1. As a control, there is no dopant or additive in the optical stack.

A silver nanowire film was first formed by coating on a 50 μm polyethylene terephthalate (PET) film substrate a nanowire coating composition that included silver nanowires. Typically, the nanowire coating composition includes about 0.05% to 1.4% silver nanowires in a water-based solvent (e.g., water or water mixed with a co-solvent such as isopropanol, ethanol, etc). Optionally, a surfactant (e.g., a fluorosurfactant) or a viscosity modifier, such as hydroxypropyl methyl cellulose (HPMC), may be included. Upon drying, the non-volatile component of the nanowire coating composition forms a nanowire layer of networking nanowires on the substrate.

Any coating methods in the art may be used. A referred method is slot-die coating, including slot-die roll-to-roll coating.

The nanowire film (including the nanowire layer and the substrate) was then laminated onto a borosilicate cover glass with a standard OCA (8146, from 3M®), the layer of networking nanowires (NWs) facing the cover glass. A black tape was placed on the top glass. Another control stack having an overcoat on the nanowire film was also prepared. See the configuration shown in FIG. 2.

The device was placed in a Xenon test chamber (0.8 W, 38° C., 50% RH). The resistivity of the Light, Edge, and Dark areas were monitored by a non-contact method (Delcom). A regular (control) film showed the following light stability data, as represented by the amount of time exposed to the xenon light source before sheet resistance change by at least 20% or more:

Light area: 200 hrs.
Edge area: 100 hrs.
Dark area: more than 200 hours.

As demonstrated in this control, under light exposure, the sheet resistance of a conductive film having conductive nanostructures (e.g., silver nanostructures or silver nanowires) could drift higher (less conductive). The edge area has an even more rapid drift compared to the light area. See also FIG. 3.

Example 2

Nanowire Coating Composition Doped with Iron Citric Tribasic

Nanowires were prepared according to the process described in U.S. Provisional Applications No. 61/978,715 and 62/075,733, in the name of Cambrios Technologies Corporation, the assignee of the present application. Both of these applications are incorporated herein by reference in their entireties.

Ink A (Control Ink):
An undoped nanowire ink was prepared as a control. The undoped nanowire ink contained 0.136% silver, 0.28% HPMC 311 (a viscosity modifier or binder), and Capstone® 175 ppm FS-3100 (a nonionic fluorosurfactant sold by DuPont).

Ink B:
A doped nanowire ink was prepared. Compared to Ink A, the doped Ink B is more diluted, though the relative amounts of the constituents stayed constant. A dopant was added to provide the following concentrations: 0.06% silver, 0.12% HPMC311, 77 ppm Capstone® FS-3100, and 65.3 ppm iron citrate tribasic monohydrate (transition metal dopant).

Films made from Ink A and Ink B, with and without overcoat, were then exposed under room light or UV light. As shown in Table 1 below, light stability of the nanowire films is improved without compromising the sheet resistance of films as well as the performance under other reliability conditions.

TABLE 1

Sheet Resistance (R) of Nanowire Films With vs. Without Light Exposure

| Nanowire films | With Light | | With OverCoat | |
|---|---|---|---|---|
| | R | | exposure | | R |
| H % | (ohm/sq) | H % | R (ohm/sq) | H % | (ohm/sq) |
| No additive | 1.68 | 66 | 1.65 | 65 | 1.38 | 58 |
| With additive | 1.65 | 84 | 1.65 | 66.8 | 1.34 | 63 |

Figure 3:
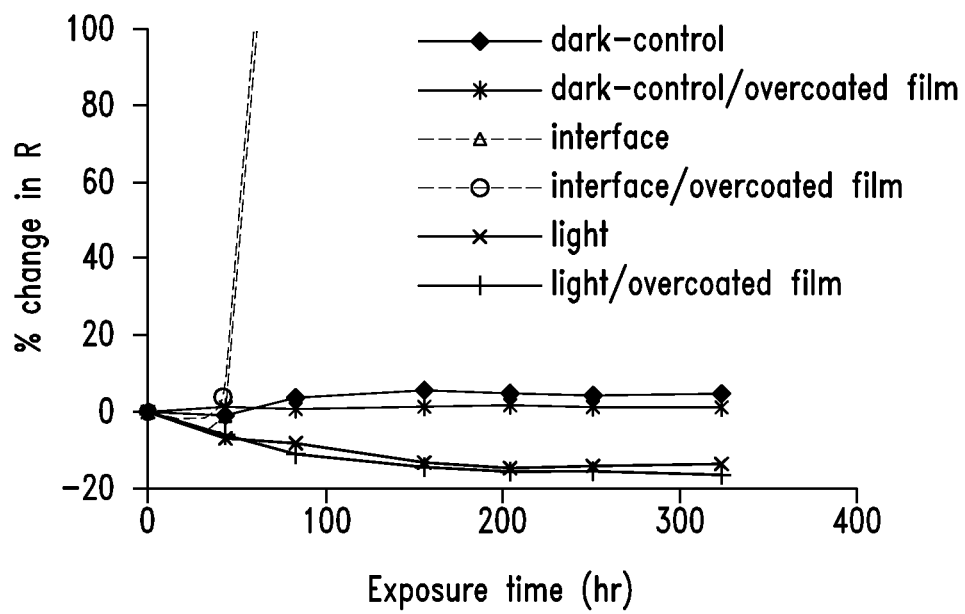
FIG. 3 shows the sheet resistance change and edge failure with time in a standard optical stack under light exposure.

FIG. 3 shows the sheet resistance in light-exposed films (bare or overcoated) with no dopant. As shown, the edge failure was pronounced at the interface of the dark and light areas for both bare film and overcoated film, whereby the sheet resistance increases sharply upon being exposed to xenon light for about 50 hours. In contrast, sheet resistance remained relative constant for hundreds of hours in the light exposed area for bare film and overcoated film, comparable to those not exposed to light at all (i.e., dark controls).

Figure 4:
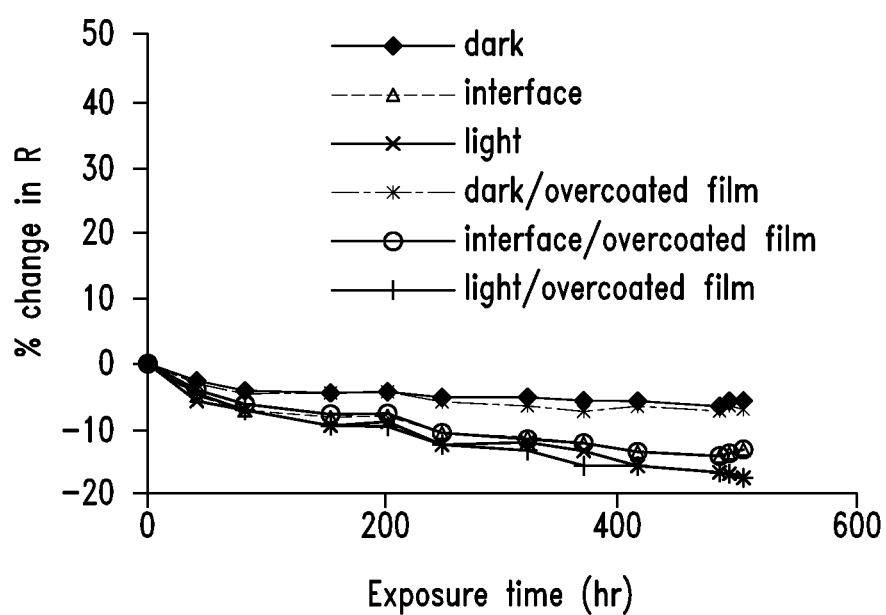
FIG. 4 shows the changes of sheet resistance over time, under xenon light, of an optical stack formed with silver nanowire ink doped with a light stabilizer.

FIG. 4 shows the comparative results of doped films under xenon light. As shown, there was imperceptible edge failure, and the reliability of the films was achieved over a period of hundreds of hours.

Figure 5:
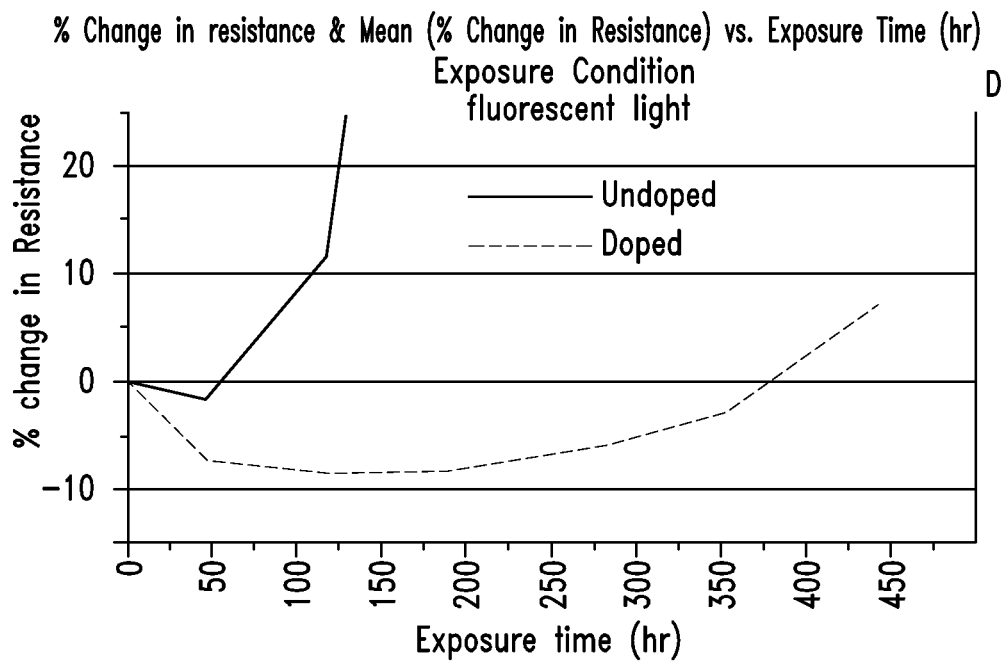
FIG. 5 shows the changes of sheet resistances over time, under fluorescent light, of optical stacks formed from ink doped with a light stabilizer as compared to a standard optical stack form from control ink with no light stabilizer.

FIG. 5 shows a side-by-side comparison of doped and undoped conductive films exposed to fluorescent light. Consistent with the results shown in FIGS. 3 and 4, the doped film exhibited much better long-term light stability as compared to the undoped film.

Example 3

Nanowire Coating Composition Doped with FeSO$_4$

In this example, Iron (II) sulfate (FeSO$_4$) was added to a standard nanowire coating composition at a molar ratio of >0.3:1 relative to a total amount of silver nanowires. The standard ink without light stability additive ("control ink") is composed of 0.06% silver, 0.12% HPMC, 77.2 ppm Capstone® FS-3100. To this standard nanowire coating composition, $FeSO_4$ was added at 25.3 ppm.

As a control, the standard nanowire coating composition (undoped) having the same amount of silver nanowires was also formed into an optical stack according to the configurations of FIG. 1 and FIG. 2.

Figure 6:
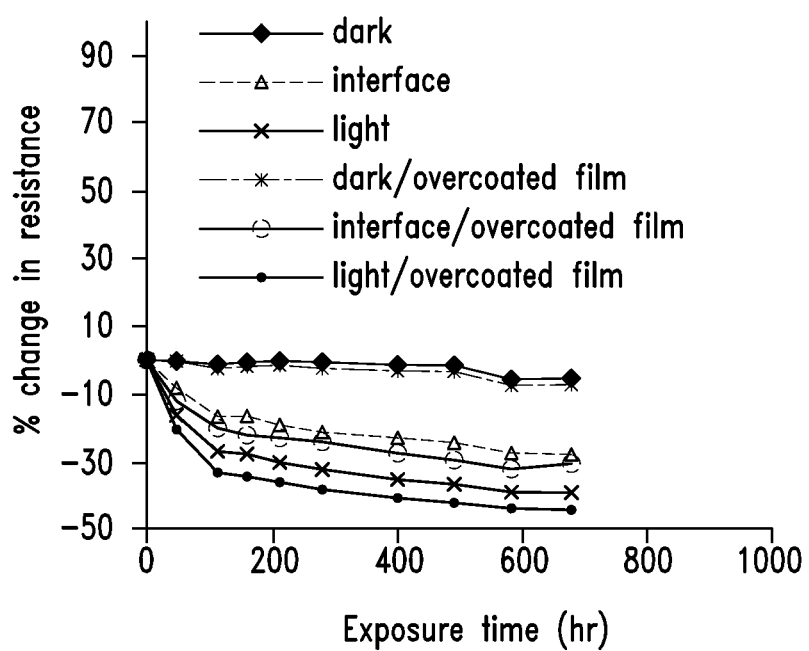
FIG. 6 shows the sheet resistance change with time and the delay of edge failure in an optical stack formed with silver nanowire ink doped with a $FeSO_4$ additive.

FIG. 6 shows the sheet resistance of the transparent conductive film formed from the standard coating composition may increase by a factor of more than two when compared to the conductive film formed from the doped nanowire coating composition. FIG. 6 also shows that the edge failure was delayed by more than 500 hours.

When the two inks were coated on a Toray U483 PET (Toray, Inc. under the designation U438) at various amount of silver nanowires coverage, the resistance of the film made from the doped ink is higher than the standard ink at the same haze. Haze is forward scattering of light from silver nanowires surface, thus, a similar haze means a similar amounts of silver nanowires on the PET films.

Figure 7:
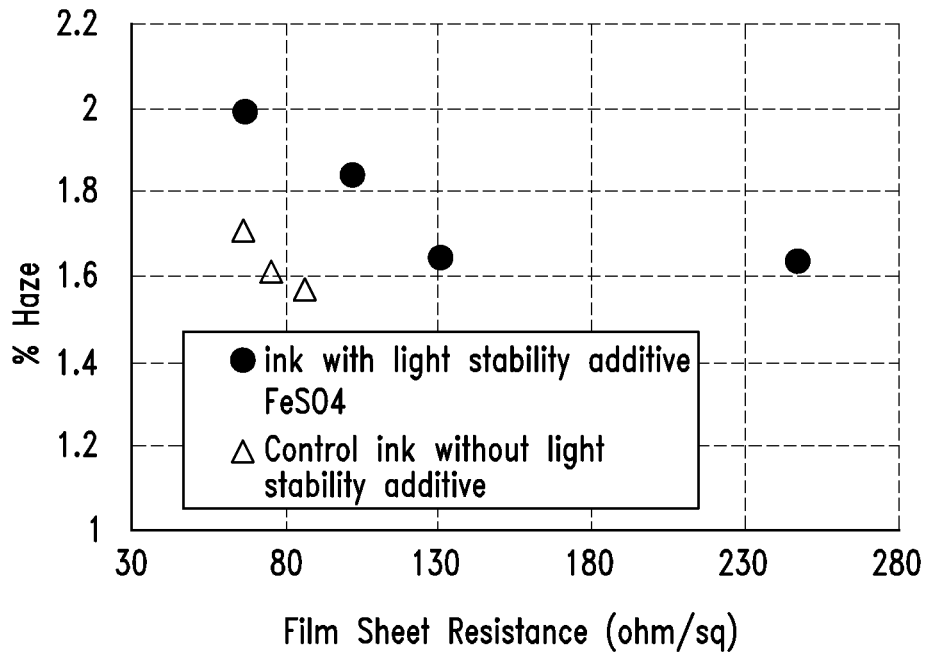
FIG. 7 shows the correlation of haze and sheet resistance of conductive films formed of ink doped with a $FeSO_4$ additive and control ink with no light stabilizer.

FIG. 7 shows haze vs film sheet resistance for the two inks, namely, doped and undoped control ink. For the similar haze, ink with the light stabilizer produced a conductive film of a higher sheet resistance.

Example 4

High Pressure Lamination

Figure 8:
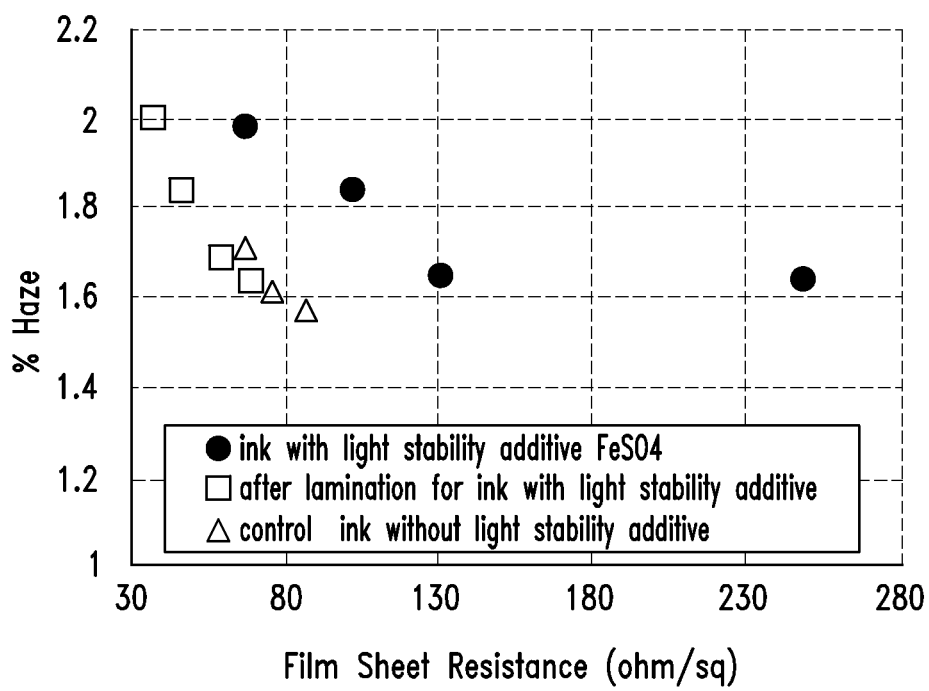
FIG. 8 shows sheet resistance vs haze of films coated with control ink with no light stabilizer, films coated with ink with a light stabilizer and films with a light stabilizer after high pressure lamination.

The conductive film formed from the doped nanowire composition of Example 3 (0.06% silver nanowires, 0.12% HPMC, 77.2 ppm Capstone® FS-3100, 25.3 ppm of $FeSO_4$) showed relatively high sheet resistance at given haze levels, as shown in FIG. 8 (circles). When the same films were passed through a laminator at an applied pressure in the range of 70-90 MPa, the resistance lowered to the level of control films (films without transition metal dopants). This demonstrates that high-pressure lamination can effectively lower sheet resistance in films made from doped ink.

Example 5

Incorporating Complexing Agents for Reducing Sheet Resistance

Figure 9:
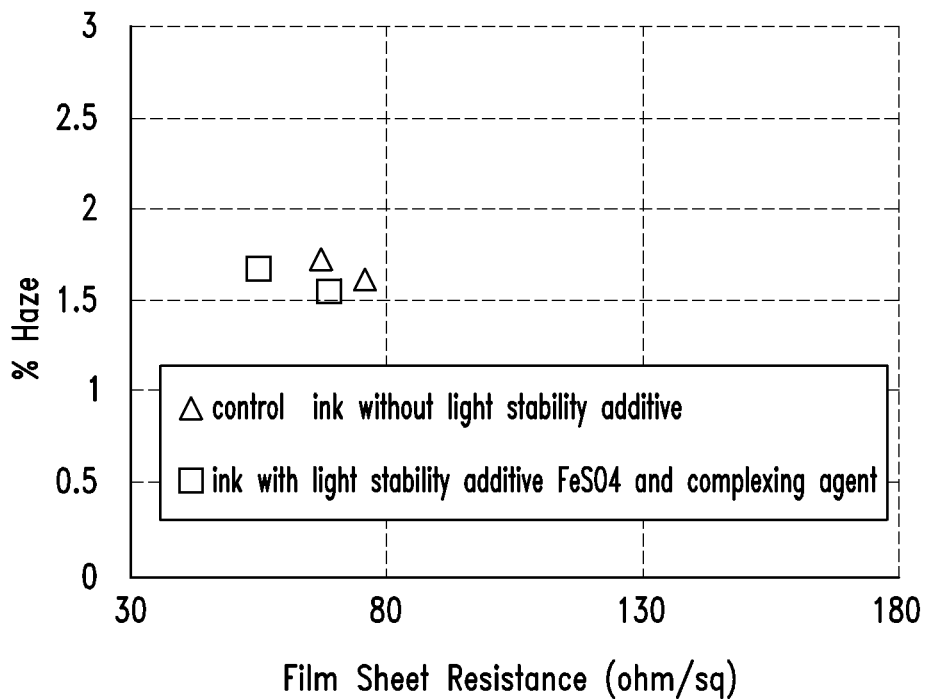
FIG. 9 shows sheet resistance vs haze of films coated with control ink with no light stabilizer, and films coated with ink doped with a light stabilizer and a complexing agent.

Another method to lower the sheet resistance of silver nanowire film formed from nanowire coating compositions doped with transition metal dopant is to add additional complexing agents, such as Hexafor 612 (Maflon, Bergamo Italy), FSOA, FSOB, $OH^-$, acid (e.g., organic acid), etc. As shown in FIG. 9, ink with the $FeSO_4$ dopant and complexing agent Hexafor 612 produced a conductive film of a similar haze-resistance relationship as that of the control film formed of undoped coating composition.

Example 6

Adjusting pH to Lower Sheet Resistance

Figure 10:
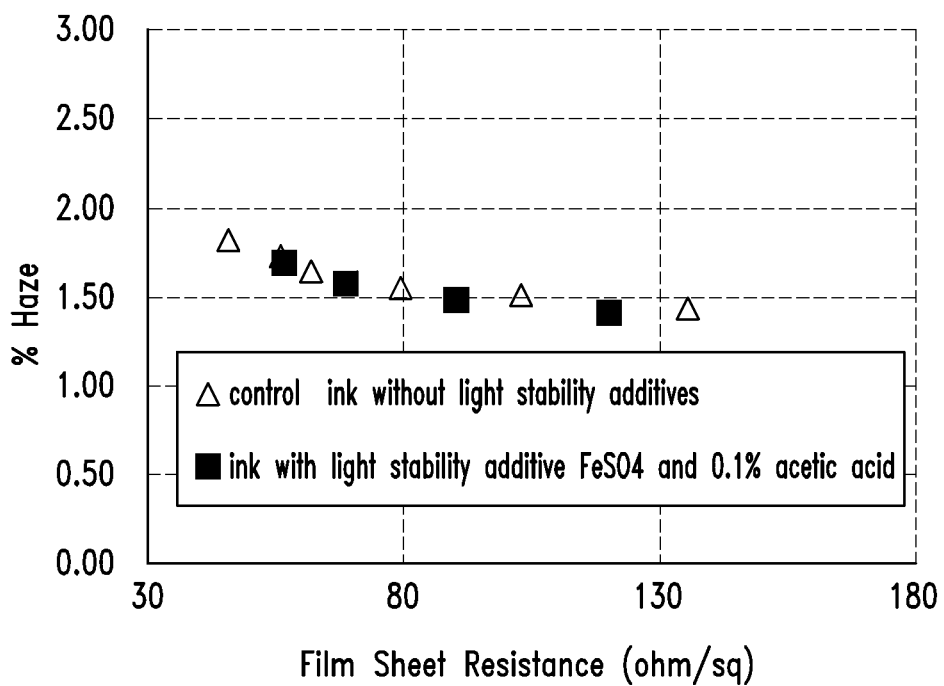
FIG. 10 shows sheet resistance vs haze of films coated with control ink with no light stabilizer, and films coated with ink with a light stabilizer and a pH adjuster.

Yet another method to lower the sheet resistance of silver nanowire film formed from nanowire coating compositions doped with transition metal dopant is to add a small amount of pH adjuster, such as an acid to reduce the pH of the ink. Suitable acids include nitric acid, acetic acid, etc. FIG. 10 shows sheet resistance vs haze of films coated with control ink and films coated with ink doped with $FeSO_4$ and acetic acid. As shown, ink with the $FeSO_4$ dopant and acetic acid has a similar haze-resistance relationship as that of the control film.

Example 7

Nanowire Composite Film on Pet Doped with Iron (III) Acetylacetonate

To prepare the $Fe(III)(acac)_3$-doped overcoat, a UV-curable acrylate mixture was used (HC 5619, Addison Clear Wave Coatings Inc.). HC 5619 contains a mixture of acrylates in a 50/50 mixture of isopropanol (IPA) and diacetone alcohol at high concentration (40 wt % solids). This concentrated overcoat composition was diluted with IPA/diacetone alcohol (50:50) to a concentration in the range of 1-3% of solid. The light stabilizer, i.e., $Fe(III)(acac)_3$, was added to the diluted acrylates at a dopant level of 70-1500 ppm by weight of the doped overcoat solution.

A nanowire-based transparent film having a PET substrate was overcoated on the nanowire side by coating the doped overcoat solution. An optical stack was then constructed as described in Example 1.

Figure 11:
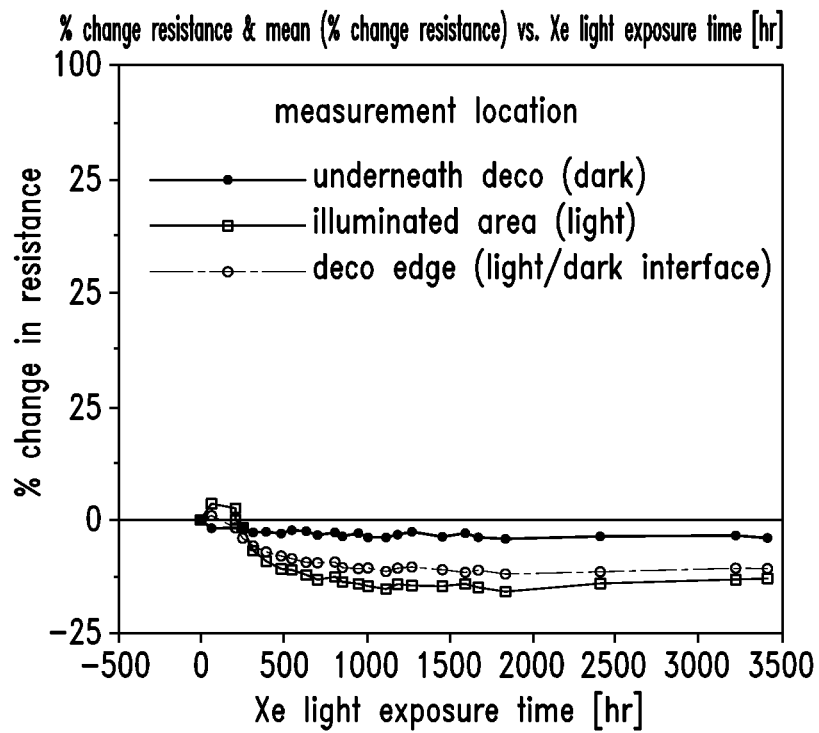
FIG. 11 shows the sheet resistance change with time and the delay of edge failure of a nanostructure film having an overcoat doped with a transition metal additive as a light stabilizer according to one embodiment.

FIG. 11 shows superior light stability with no increase in resistance for 3400 hrs when exposed to Xe light at 38° C. and 50% R.H., illustrating that $Fe(acac)_3$ is efficient as a light stabilizer.

Example 8

Nanowire Composite Film on Pet Doped with Cobalt Acetylacetonate

The conductive film prepared in Example 1 was first soaked in a 1% solution of cobalt acetylacetonate ("$Co(acac)_2$") in acetone for 24 hrs, rinsed with acetone, and dried with nitrogen. It is believed that some $Co(acac)_2$ is able to diffuse into the film. A device was then constructed as in Example 1. The device has better light stability than the standard optical stack of Example 1, thus demonstrating that $Co(acac)_2$ is suitable as a light stabilizer (up to 1500 hours with no significant increase in resistance).

Figure 12:
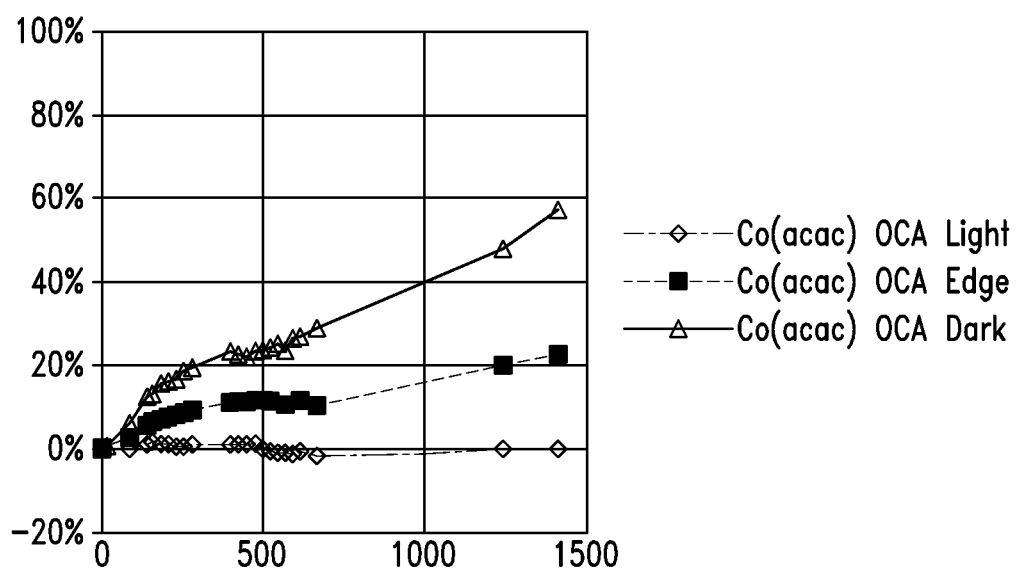
FIG. 12 shows the sheet resistance change with time and the delay of edge failure of a nanostructure film having an overcoat doped with another transition metal additive as a light stabilizer according to another embodiment.

When a transfer film OCA layer was soaked in a solution of 1% $Co(acac)_2$ in hexane for 24 hours, rinsed with hexane, and then transferred onto the nanowire layer as shown in FIG. 1, the resistance of the resulting optical stack in the area thereof that was exposed to light did not show significant change in resistance when exposed to a xenon light source at 38° C. and 50% relative humidity for nearly 1500 hrs. See FIG. 12. Also shown in FIG. 12 is that the sheet resistance at the edge and dark areas of the optical stack in which $Co(acac)_2$ was added to the OCA were substantially stable (less than 20% changes for up to 1000 hours).

Figure 13:
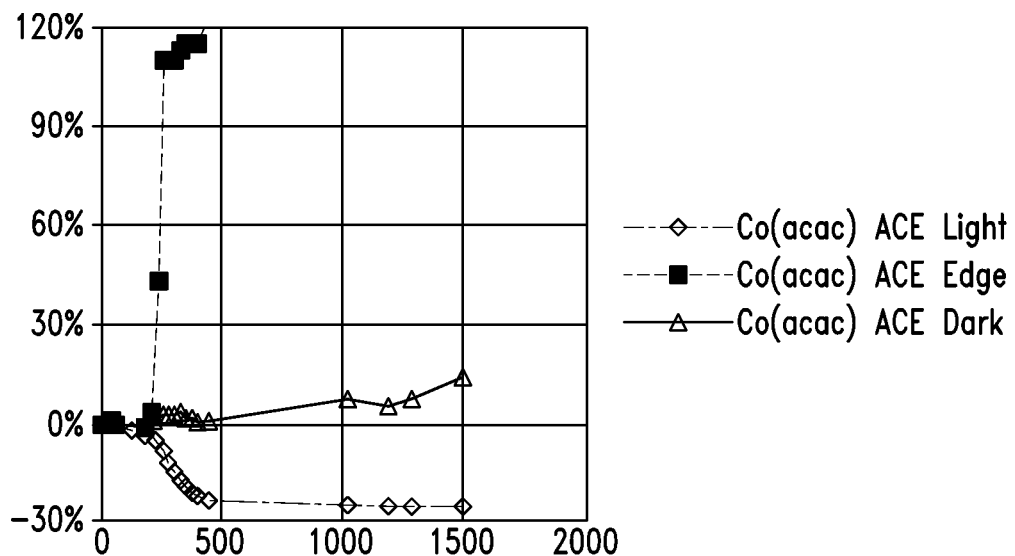
FIG. 13 shows the lack of light stabilizing effect of certain transition metal additive.

FIG. 13 shows resistance as a function of time in the light, edge and dark areas of the nanowire layer of an optical stack in which $Co(acac)_2$ was diffused into the nanowire layer.

Example 9

Nanowire Composite Film on Pet Doped with Manganese Acetylacetonate

The nanowire film used in Example 1 was first soaked in a 1% solution of $Mn(acac)_3$ in acetone for 24 hrs, rinsed with acetone, and dried with nitrogen. It is believed that some manganese acetylacetonate is able to diffuse into the film. A device was then constructed as exposed to xenon light as in Example 1. This device showed worse light stability than Example 1, thus demonstrating that manganese acetylacetonate is not suitable as a light stabilizer.

Light area: resistance increased by at least 20% in about 200 hrs.

Edge area: resistance increased by at least 20% at about 250 hrs.

Dark area: resistance did not increase by more than 20% in at least 250 hours.

Example 10

Nanowire Composite Film on Pet Doped with Vanadyl Acetylacetonate ("VO(acac)$_2$")

Figure 14:
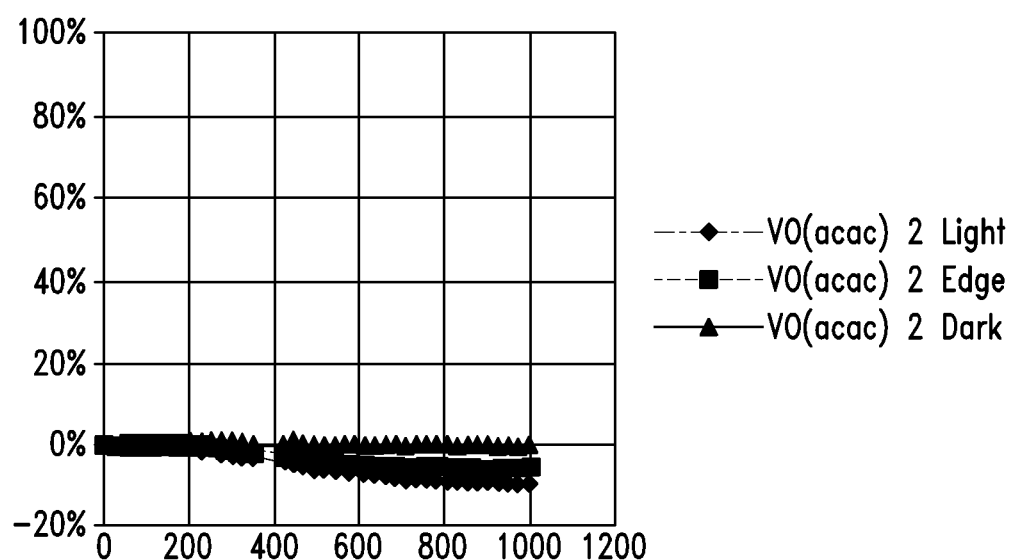
FIG. 14 shows the sheet resistance change with time and the delay of edge failure of a nanostructure film having an overcoat doped with yet another transition metal additive as a light stabilizer according to yet another embodiment.

The nanowire film used in Example 1 was first soaked in a 1% solution of VO(acac)$_2$ in acetone for 24 hrs, rinsed with acetone, and dried with nitrogen. It is believed that some vanadyl acetylacetonate is able to diffuse into the film. A device was then constructed and exposed to a xenon light source as in Example 1. This device showed even better light stability than Example 8, thus demonstrating that vanadyl acetylacetonate is suitable as a light stabilizer (see FIG. 14).

Example 11

Nanowire Composite Film on Pet Doped with Ferrocene (Fc)

Figure 15:
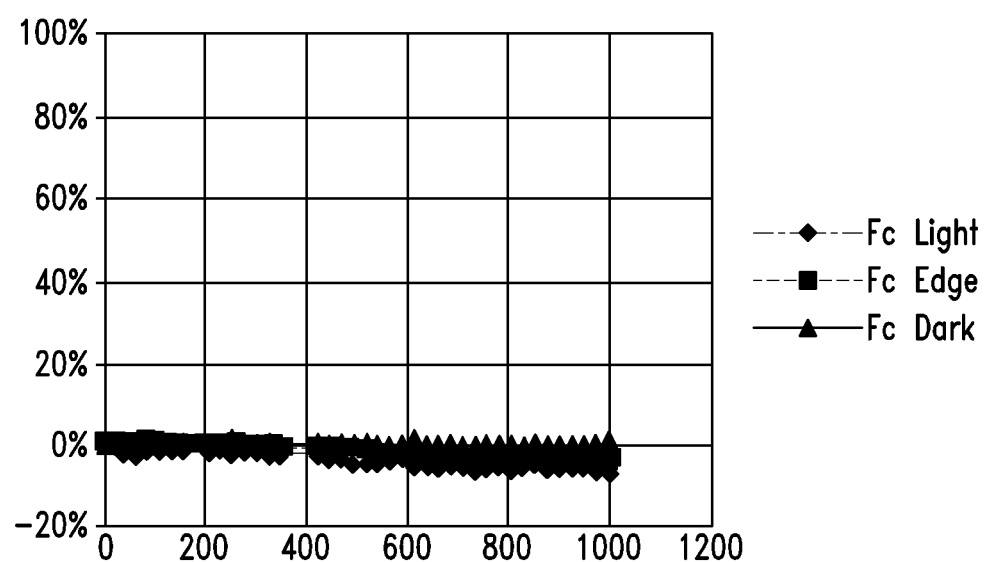
FIG. 15 shows the sheet resistance change with time and the delay of edge failure of a nanostructure film having an overcoat doped with ferrocene.

The nanowire transparent film used in Example 1 was first soaked in a 1% solution of ferrocene (Fc) in acetone for 24 hrs, rinsed with acetone, and dried with nitrogen. It is believed that some ferrocene is able to diffuse into the film. A device was then constructed and exposed to a xenon light source as in Example 1. FIG. 15 shows the percent change in resistance of the nanowire layer as a function of hours of light exposure. As shown in FIG. 15, this device showed excellent light stability, thus demonstrating that ferrocene is suitable as a light stabilizer.

Light area: more than 1000 hrs without significant increase in resistance (e.g., less than 1% or 2%).

Edge area: more than 1000 hrs without significant increase in resistance (e.g., less than 1% or 2%)

Dark area: more than 1000 hrs without significant increase in resistance (e.g., less than 1% or 2%)

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An optical stack comprising:
a first substrate;
a nanowire layer overlying the first substrate and including a plurality of silver nanowires;
an optically clear adhesive layer overlying the nanowire layer;
a second glass substrate overlying the optically clear adhesive layer, wherein the nanowire layer is located between the first substrate and the second glass substrate; and
a light stabilizer acting as a catalyst to accelerate a reaction of oxygen with organic materials present in the optical stack, wherein:
the light stabilizer comprises $FeSO_4$,
the light stabilizer is incorporated in the nanowire layer,
the nanowire layer comprises acetic acid, and
a material of the light stabilizer is selected to at least one of:
thermally degrade such that at least a portion of the optical stack has a first resistance prior to exposure to heat and has a second resistance after exposure to the heat, or
degrade upon exposure to UV light such that at least a portion of the optical stack has a first resistance prior to exposure to the UV light and has a second resistance after exposure to the UV light.

2. The optical stack of claim 1, wherein the light stabilizer is further incorporated in the first substrate or the second glass substrate.

3. The optical stack of claim 1, wherein the light stabilizer is further incorporated in the optically clear adhesive layer.

4. The optical stack of claim 1, further comprising an overcoat interposed between the nanowire layer and the optically clear adhesive layer, the overcoat contacting the plurality of silver nanowires, and incorporating the light stabilizer, wherein the light stabilizer is at about 0.14%-30% by weight of a polymeric material of the overcoat.

5. The optical stack of claim 4, wherein the light stabilizer is at about 0.3%-8%, 0.5%-10%, 0.7%-15%, 1%-10%, 2-8%, or 5-15% by weight of the polymeric material of the overcoat.

6. The optical stack of claim 1, further comprising bipyridine, phenanthroline, or N,N'-bis(salicylidene)ethylenediamine.

7. The optical stack of claim 1, wherein the optical stack is soaked in a solution of the light stabilizer to allow the light stabilizer to diffuse into the optical stack.

8. The optical stack of claim 1, wherein the light stabilizer is applied to the first substrate as a conductive film and heat is applied to the conductive film during a lamination process to change a resistance of the conductive film from the first resistance to the second resistance.

9. The optical stack of claim 8, wherein, during the lamination process, a pressure of 70-90 MPa is applied to the conductive film.

* * * * *